(12) United States Patent
Iwamatsu et al.

(10) Patent No.: US 8,397,232 B2
(45) Date of Patent: Mar. 12, 2013

(54) VIRTUAL MACHINE SYSTEM EMPLOYING VIRTUAL BATTERIES AND A VIRTUAL BATTERY MANAGER MANAGING A VIRTUAL BATTERY FOR RUNNING A VIRTUAL MACHINE

(75) Inventors: Noboru Iwamatsu, Kawasaki (JP); Naoki Nishiguchi, Kawasaki (JP); Masatomo Yasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 748 days.

(21) Appl. No.: 12/492,449

(22) Filed: Jun. 26, 2009

(65) Prior Publication Data

US 2010/0023940 A1 Jan. 28, 2010

(30) Foreign Application Priority Data

Jul. 28, 2008 (JP) ................................. 2008-192966

(51) Int. Cl.
*G06F 9/455* (2006.01)
*G06F 9/46* (2006.01)
*G06F 1/00* (2006.01)
(52) U.S. Cl. .............................. 718/1; 718/104; 713/300
(58) Field of Classification Search ........................ None
See application file for complete search history.

(56) References Cited

U.S. PATENT DOCUMENTS

| | | | |
|---|---|---|---|
| 7,007,183 B2 | 2/2006 | Rawson, III | |
| 7,583,951 B2 * | 9/2009 | Gibbs | 455/343.5 |
| 7,783,909 B2 * | 8/2010 | Hatasaki et al. | 713/324 |
| 7,861,102 B1 * | 12/2010 | Ranganathan et al. | 713/300 |
| 7,970,903 B2 * | 6/2011 | Oeda | 709/226 |
| 7,971,078 B2 * | 6/2011 | Govindan et al. | 713/300 |
| 8,028,179 B2 * | 9/2011 | Zettler | 713/320 |
| 2002/0138774 A1 * | 9/2002 | Imada et al. | 713/300 |
| 2005/0251802 A1 | 11/2005 | Bozek et al. | |
| 2005/0268078 A1 * | 12/2005 | Zimmer et al. | 713/1 |

(Continued)

FOREIGN PATENT DOCUMENTS

| | | |
|---|---|---|
| JP | 2004-192612 | 7/2004 |
| JP | 2006-087228 | 3/2006 |

(Continued)

OTHER PUBLICATIONS

Reference AG (Japanese Laid-Open Patent No. 2007-536657) corresponds to Reference AA (U.S. Patent Publication No. 2005/0251802).

(Continued)

*Primary Examiner* — Jennifer To
*Assistant Examiner* — Tammy Lee
(74) *Attorney, Agent, or Firm* — Staas & Halsey

(57) ABSTRACT

A virtual machine system includes a virtual battery manager, a discharge calculator, and a discharger. The virtual battery manager manages a virtual battery for running a virtual machine. The virtual battery holds electric energy used by the virtual machine. The virtual battery is capable of discharging and being charged. The discharge calculator calculates a discharged amount of the virtual battery by calculating energy consumption of the virtual machine with reference to a consumption policy and a consumption allocation table when a resource quota for the virtual machine satisfies a predefined condition for discharging. The consumption policy defines a maximum amount of total energy consumption of the plurality of virtual machines. The consumption allocation table contains an allocated ratio of energy consumption for each of the plurality of virtual machines. The discharger decreases a battery level of the virtual battery.

19 Claims, 9 Drawing Sheets

U.S. PATENT DOCUMENTS

| | | | |
|---|---|---|---|
| 2007/0243852 A1* | 10/2007 | Gibbs | 455/343.5 |
| 2008/0186086 A1* | 8/2008 | Bell | 327/544 |
| 2008/0301473 A1* | 12/2008 | Perez et al. | 713/300 |
| 2009/0113221 A1* | 4/2009 | Holle et al. | 713/310 |
| 2012/0005505 A1* | 1/2012 | Tolia et al. | 713/320 |

FOREIGN PATENT DOCUMENTS

| | | |
|---|---|---|
| JP | 2006-113767 | 4/2006 |
| JP | 2007-011992 | 1/2007 |
| JP | 2007-272297 | 10/2007 |
| JP | 2007-536657 | 12/2007 |

OTHER PUBLICATIONS

Reference AH (Japanese Laid-Open Patent No. 2004-192612) corresponds to Reference AB (U.S. Patent No. 7,007,183).

Japanese Office Action issued in corresponding Japanese Patent Application No. 2008-192966 (7 pages) (2 pages English translation).

* cited by examiner

131

| VM ID | VM STATUS | CPU ALLOCATED TIME (sec) | VM STOP TIME (sec) |
|---|---|---|---|
| VM1 | RUNNING | 186.5 | 0 |
| VM2 | STOPPED | 0 | 2400 |
| VM3 | RUNNING | 32.1 | 0 |
| ... | ... | ... | ... |
| VM8 | STOPPED | 0 | 312 |

| VM ID | vBAT STATUS | vBAT LEVEL (Wh) | vBAT CAPACITY (Wh) |
|---|---|---|---|
| VM1 | DISCHARGING | 13.9 | 45 |
| VM2 | BEING CHARGED | 70 | 90 |
| VM3 | DISCHARGING | 38.2 | 45 |
| ... | ... | ... | ... |
| VM8 | BEING CHARGED | 43.5 | 45 |

FIG. 3

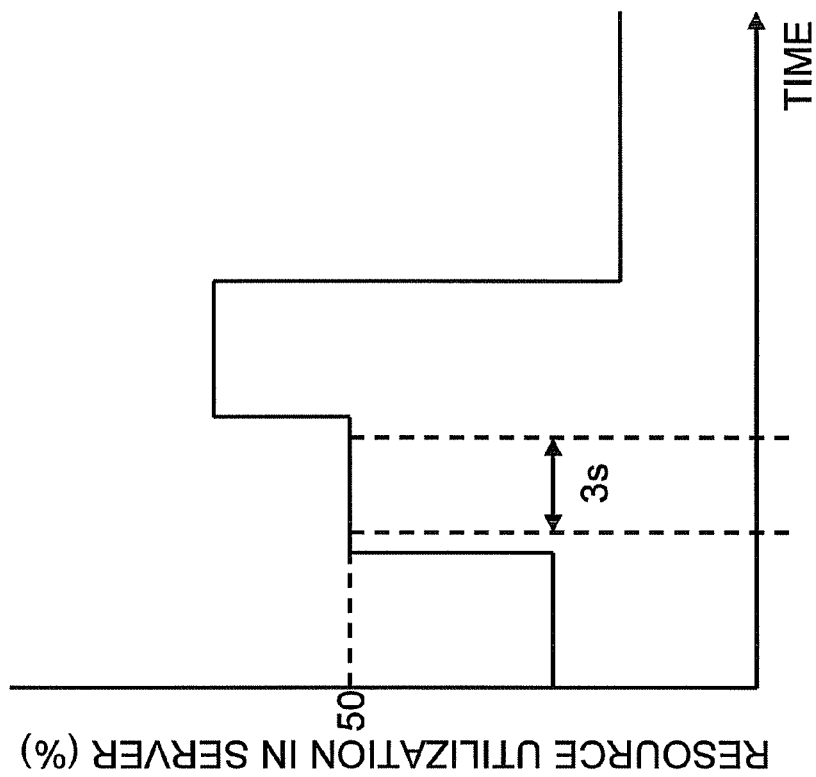
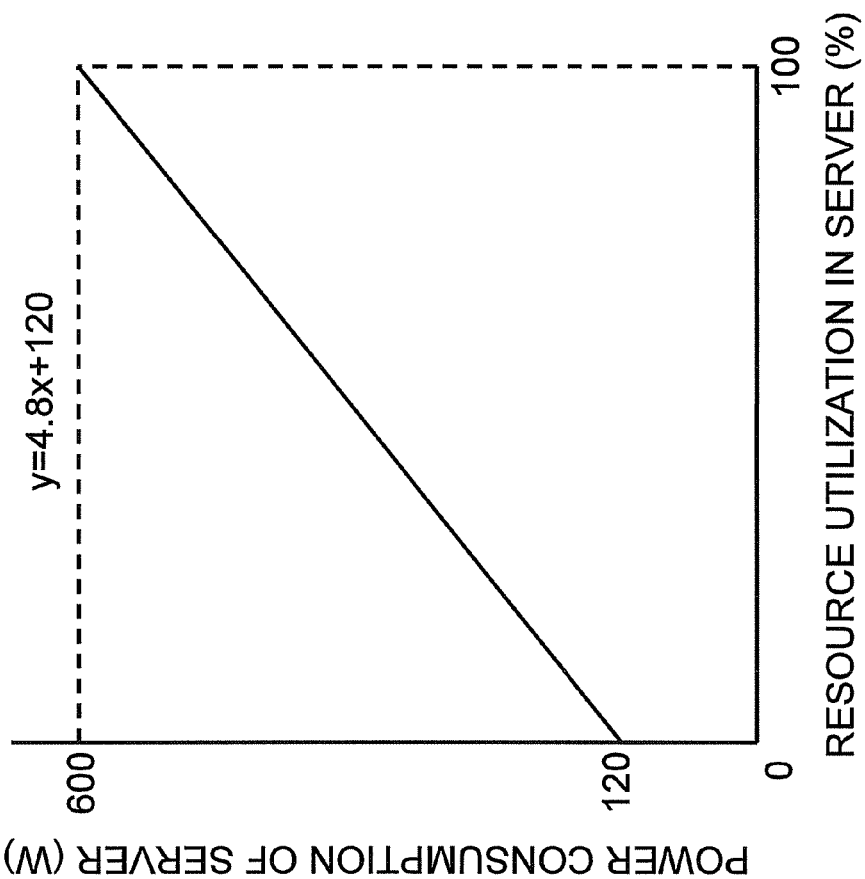

*113*

| VM ID 1131 | RATIO OF ENERGY CONSUMPTION (%) 1132 | RATIO OF CHARGE (%) 1133 |
|---|---|---|
| VM1 | 10 | 10 |
| VM2 | 10 | 10 |
| VM3 | 10 | 10 |
| VM4 | 10 | 10 |
| VM5 | 10 | 10 |
| VM6 | 10 | 10 |
| VM7 | 10 | 10 |
| VM8 | 10 | 10 |
| VM9 | 10 | 10 |
| VM10 | 10 | 10 |

| TIME RANGE 1511 | ENERGY CONSUMPTION PER HOUR 1512 |
|---|---|
| 00:00 - 24:00 | 480Wh |

| VM ID 1131 | RATIO OF ENERGY CONSUMPTION (%) 1132 | RATIO OF CHARGE (%) 116 |
|---|---|---|
| VM1 | 10 | 10 |
| VM2 | 20 | 20 |
| VM3 | 10 | 10 |
| VM4 | 10 | 10 |
| VM5 | 10 | 10 |
| VM6 | 10 | 10 |
| VM7 | 20 | 20 |
| VM8 | 10 | 10 |

FIG. 8C — 112

| TIME RANGE 1121 | BATTERY CHARGE PER HOUR 1122 |
|---|---|
| 00:00 – 08:00 | 60Wh |
| 08:00 – 13:00 | 96Wh |
| 13:00 – 16:00 | 160Wh |
| 16:00 – 22:00 | 96Wh |
| 22:00 – 24:00 | 60Wh |

VIRTUAL MACHINE SYSTEM EMPLOYING VIRTUAL BATTERIES AND A VIRTUAL BATTERY MANAGER MANAGING A VIRTUAL BATTERY FOR RUNNING A VIRTUAL MACHINE

CROSS-REFERENCE TO RELATED APPLICATION

This application is based upon and claims the benefit of priority of the prior Japanese Patent Application No. 2008-192966, filed on Jul. 28, 2008, the entire contents of which are incorporated herein by reference.

FIELD

The embodiments discussed herein are related to a virtual machine system which runs a plurality of virtual machines on a physical machine.

BACKGROUND

The virtual machines (also referred to as VMs) are run, by a virtualization technology, on a physical computer logically divided into a plurality of computers (VMs) each executing an operating system (referred to as a guest OS) independent from others. The integration and consolidation of the operating systems (OSs) implemented in a plurality of computers to one computer allows an effective use of hardware resources such as a central processing unit (CPU) and a storage and may save power and spaces. Since the Kyoto Protocol came into effect in 2005, the environmental efforts of companies and local governments to address the global warming issue have received attention, and the needs for power saving with server virtualization have increased.

Power saving operation methods have been known by which virtual machines are efficiently integrated in accordance with work loads to shut down power supply to redundant servers, by using a live migration technology that moves a virtual machine in operation to another server without stopping. "VMware (registered trade mark) VirtualCenter" by VMware, Inc. is known as one of management tools that automatically implement the live migration in accordance with a load status of each virtual machine.

Alternatively, a method that implements the live migration on the basis of the energy consumption and resource utilization in the server running virtual machines has been proposed (for example, refer to Japanese Laid-open Patent Publication No. 2007-536657).

The methods for resource allocation on a server may include a method that monitors the load statuses of virtual machines and changes the resource allocation, a method that changes the resource allocation to a guest OS in accordance with a energy consumption control request issued by the guest OS, and a method that controls unused system resources to save power.

Conventional technologies monitor the statuses of virtual machines and change the resource quota to a virtual machine with a low load or release unused resources.

SUMMARY

According to an aspect of the present invention, provided is a virtual machine system for running a plurality of virtual machines on a physical machine. The virtual machine system includes a virtual battery manager, a schedule manager, a resource quota manager, a discharge calculator, and a discharger.

The virtual battery manager manages a virtual battery for running a virtual machine. The virtual battery holds electric energy used by the virtual machine. The virtual battery is capable of discharging and being charged.

The schedule manager allocates a resource of the physical machine to the virtual machine.

The resource quota manager manages a resource quota for each of the plurality of virtual machines in accordance with status data acquired from the schedule manager. The status data indicates an allocated status of the resource on each of the plurality of virtual machines.

The discharge calculator calculates a discharged amount of the virtual battery by calculating energy consumption of the virtual machine with reference to a consumption policy and a consumption allocation table when the resource quota for the virtual machine satisfies a predefined condition for discharging. The consumption policy defines a maximum amount of total energy consumption of the plurality of virtual machines. The consumption allocation table contains an allocated ratio of energy consumption for each of the plurality of virtual machines.

The discharger decreases a battery level of the virtual battery.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of a data configuration of a quota table used in a virtual machine system according to a first embodiment of the present invention;

FIG. 3 is a diagram illustrating an example of a data configuration of a virtual battery management table used in a virtual machine system according to a first embodiment of the present invention;

FIG. 5A is a graph illustrating an example of a relationship between energy consumption and resource utilization in a server of a virtual machine system according to a first embodiment of the present invention;

FIG. 5B is a graph illustrating an example of variation of resource utilization over time in a server of a virtual machine system according to a first embodiment of the present invention;

FIG. 6A is a diagram illustrating an example of a data configuration of a consumption policy set in a server of a virtual machine system according to a first embodiment of the present invention;

FIG. 6B is a diagram illustrating an example of a data configuration of an allocation table set in a server of a virtual machine system according to a first embodiment of the present invention;

FIG. 8C is a diagram illustrating an example of a data configuration of a charge policy set in a server of a virtual machine system according to a first embodiment of the present invention;

FIG. 8D is a diagram illustrating an example of a data configuration of an allocation table set in a server of a virtual machine system according to a first embodiment of the present invention.

DESCRIPTION OF EMBODIMENTS

Today, setting a target for reduced carbon dioxide emissions and electric load leveling are being under review, and energy consumption is now a more urgent problem. Therefore, it is desirable that an upper limit of energy consumption is preset for each server and that virtual machines are controlled so as to operate under the limit.

However, in the past, no resource control methods have been available that manage the resource allocation to virtual machines in consideration of the energy consumption.

The virtual machine system discussed in embodiments of the present invention virtually causes a plurality of operating systems to operate to run a plurality of virtual machines by a virtual battery. The virtual battery virtually supplies power to a virtual machine in accordance with energy consumption of a physical machine (hereinafter also simply referred to as a computer or a server) of the virtual machine system. The virtual battery may discharge and be charged. By using the virtual battery, energy consumption of the virtual machine system may be suppressed and proper resource allocation to the virtual machines in accordance with the energy consumption may be realized.

First Embodiment

Figure 1:
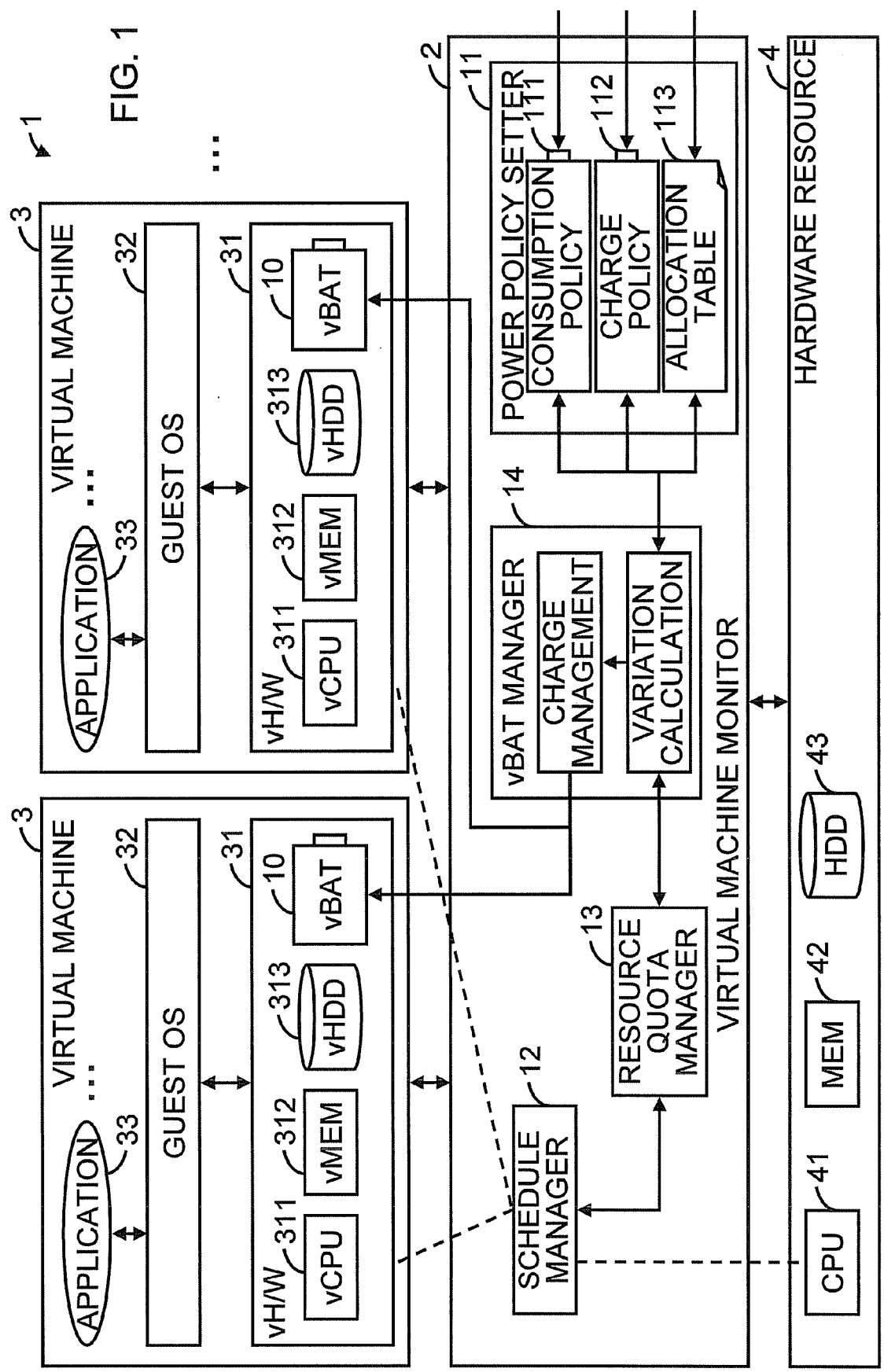
FIG. 1 is a diagram illustrating a configuration of a virtual machine system according to a first embodiment of the present invention.

FIG. 1 is a diagram illustrating a configuration of a virtual machine system according to a first embodiment of the present invention.

A virtual machine system 1 is a computer system that runs a plurality of virtual machines 3 by employing a virtual machine monitor 2 to manage a physical memory (denoted by "MEM" in FIG. 1) 42 and a plurality of virtual memories (denoted by "vMEM" in FIG. 1) 312.

In a physical machine of the virtual machine system 1 illustrated in FIG. 1, the hardware resource 4 may include a CPU 41, the physical memory 42, and an external storage device (denoted by "HDD" in FIG. 1) 43, for example.

The virtual machine monitor 2 divides the hardware resource 4 of the computer and allocates divided hardware resource 4 to the plurality of virtual machines 3 to use the computer as a plurality of virtual machines 3.

The virtual machines 3 are components that operate by using the hardware resource 4 and may be allowed by the virtual machine monitor 2 to virtually operate as if they were independent computers by using a virtual hardware resource (denoted by "vH/W" in FIG. 1) 31.

The virtual hardware resource 31 used by the virtual machine 3 includes a virtual CPU (denoted by "vCPU" in FIG. 1) 311, the virtual memory 312, and a virtual external storage device (denoted by "vHDD" in FIG. 1) 313, for example. Each of the virtual machine 3 executes a guest OS 32 by using the virtual hardware resource 31 and executes application software 33 on the guest OS 32.

Each virtual machine 3 includes a virtual battery (denoted by "vBAT" in FIG. 1) 10 as one component of the virtual hardware resource 31. The virtual battery 10 is provided by a virtual battery manager (denoted by "vBAT MANAGER" in FIG. 1) 14 discussed later.

The virtual battery 10 is a virtual device storing finite electric energy, whose battery level may be referred and updated by the virtual machine monitor 2. The virtual machine 3 may run as long as the virtual battery 10 is alive.

The virtual machine monitor 2 includes a power policy setter 11, a schedule manager 12, a resource quota manager 13, and the virtual battery manager 14.

The power policy setter 111 sets a consumption policy 111, a charge policy 112, and an allocation table 113.

The consumption policy 111 defines energy consumption of the virtual machine system 1 per unit time, which is defined in accordance with energy consumption of the computer as a whole. The energy consumption may be defined for each time or each time range.

The charge policy 112 defines a charged amount of the virtual battery 10. The charged amount may be differently defined for time ranges. For example, a larger charged amount may be defined for a daytime range while a smaller charged amount may be defined for a nighttime range.

The allocation table 113 is a data table that defines how the energy consumption or the charged amount is to be allocated to the virtual machines 3 of the virtual machine system 1. The allocation table 113 defines an allocation ratio of the energy consumption and an allocation ratio of the charged amount for each virtual machine 3.

The schedule manager 12 allocates the hardware resource 4, such as the CPU 41 of the computer of the virtual machine system 1, to the virtual machines 3 in time-sharing.

In the allocation of the hardware resource 4 to the virtual machines 3, the schedule manager 12 may change the quotas of the hardware resource 4 in accordance with the battery level of the virtual battery 10 of the virtual machine 3. When the battery level of the virtual battery 10 is lower than or equals to a predefined amount or equals to zero, the schedule manager 12 may hold up allocation of the hardware resource 4 to a corresponding virtual machine 3.

The resource quota manager 13 manages a quota table indicating the time over which a hardware resource 4 is allocated to a virtual machine 3 by the schedule manager 12.

The quota table may indicate a load status of the computer of the virtual machine system 1, a total number of running virtual machines, and an allocated time for each virtual machine 3, for example.

FIG. 2 is a diagram illustrating an example of a data configuration of a quota table used in a virtual machine system according to a first embodiment of the present invention.

A record of the quota table 131 corresponds to a virtual machine 3 and includes a virtual machine identifier (ID) (denoted by "VM ID" in FIG. 2) 1311 capable of uniquely identifying the virtual machine 3, a virtual machine status flag (denoted by "VM STATUS" in FIG. 2) 1312 capable of indicating whether the virtual machine is running or stopped, a CPU allocated time 1313 indicating an allocated time of the CPU 41 which is one of the hardware resource, and a virtual machine stop time (denoted by "VM STOP TIME" in FIG. 2) 1314 indicating a time period over which the virtual machine 3 is stopped.

The virtual battery manager 14 provides a guest OS 32 of the virtual machine 3 with the virtual battery 10, calculates a charged amount and a discharged amount of the virtual battery 10, and controls the battery level of the virtual battery 10.

More specifically, the virtual battery manager 14 allocates electric energy corresponding to the maximum energy consumption of the physical machine of the virtual machine system 1 to the virtual machines 3. The allocation is performed in accordance with the allocation ratio defined for each of the virtual machines 3 on the allocation table 113. The allocated electric energy is held as the battery level of the virtual battery 10.

The virtual battery manager 14 regularly obtains the quota table 131 for the virtual machines 3 from the resource quota manager 13 and creates and manages a virtual battery management table for each virtual machine 3 to manage the status of the virtual battery 10 provided to the virtual machine 3.

FIG. 3 is a diagram illustrating an example of a data configuration of a virtual battery management table used in a virtual machine system according to a first embodiment of the present invention.

A record of the virtual battery management table 141 corresponds to a virtual machines 3 and includes, a virtual machine ID (denoted by "VM ID" in FIG. 3) 1411, a virtual battery status (denoted by "vBAT STATUS" in FIG. 3) 1412 capable of indicating whether the virtual battery 10 is discharging or is being charged, a virtual battery level (denoted by "vBAT LEVEL" in FIG. 3) 1413 indicating the battery level of the virtual battery 10, and a virtual battery capacity (denoted by "vBAT CAPACITY" in FIG. 3) 1414 indicating the maximum electric energy that the virtual battery 10 may hold.

The virtual battery manager 14 calculates the charged amount or the discharged amount of the virtual battery 10 of a virtual machine 3 with reference to the consumption policy 111 and the allocation table 113 when data contained in a corresponding record of the quota table 131 satisfies a predefined condition for charging or discharging.

The virtual battery manager 14 updates the virtual battery level 1413 contained in a corresponding record of the virtual battery management table 141 in accordance with the charged amount or the discharged amount.

The virtual battery manager 14 calculates the discharged amount when such a condition for discharging is satisfied that the total amount of the CPU allocated time 1313 contained in the quota table 131 for all the virtual machines 3 during a predefined time period is greater than or equals to a predefined threshold value.

The virtual battery manager 14 calculates the charged amount when such a condition for charging is satisfied that the total amount of the CPU allocated time 1313 contained in the quota table 131 for all the virtual machines 3 during a predefined time period is less than or equals to a predefined threshold value. Alternatively, the condition for charging may be that the total amount of the virtual machine stop time 1314 contained in the quota table 131 for all the virtual machines 3 is greater than or equals to a predefined threshold value.

The threshold values in the conditions for charging and discharging may be determined in accordance with the maximum energy consumption by the computer of the virtual machine system 1 or the total number of the virtual machines 3 running on the computer.

The threshold values in the conditions for charging and discharging may be defined to be different for each time or each time period.

The threshold values in the conditions for charging and discharging may be determined in accordance with a priority assigned to each of the virtual machines 3.

When a plurality of computers are provided for implementing the virtual machine system 1, the threshold values in the conditions for charging and discharging may be determined in accordance with the energy consumption assigned to each of the computers.

Figure 4:
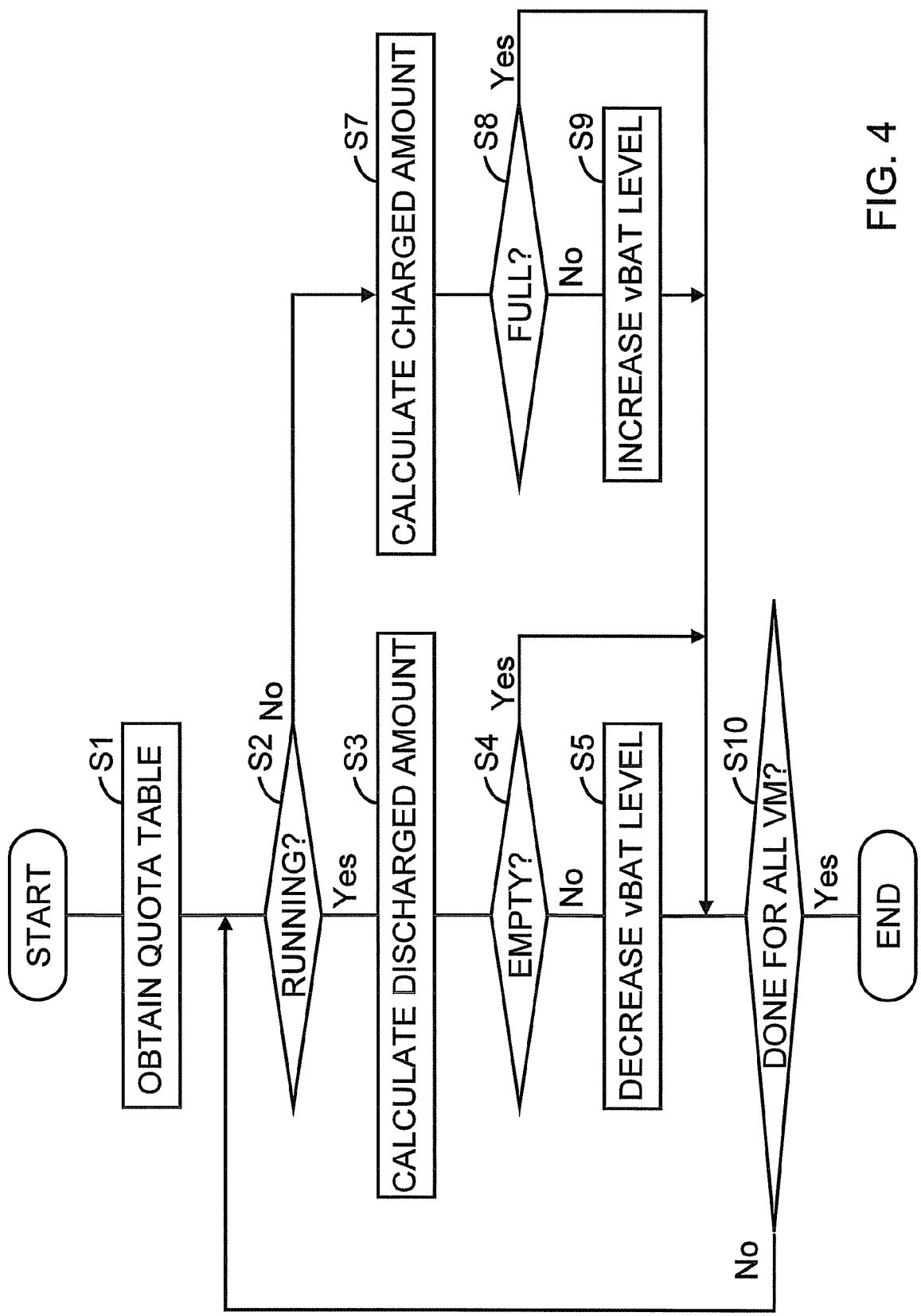
FIG. 4 is a flowchart illustrating an operational flow of a virtual battery management process performed by a virtual machine system according to a first embodiment of the present invention.

FIG. 4 is a flowchart illustrating an operational flow of a virtual battery management process performed by a virtual machine system according to a first embodiment of the present invention.

In operation S1, the virtual battery manager 14 obtains the quota table 131 for the virtual machines 3 from the resource quota manager 13.

In operation S2, the virtual battery manager 14 determines for each of the virtual machines 3 whether the virtual machine 3 is running.

In operation S3, when the virtual machine 3 is running ("Yes" in operation S2), the virtual battery manager 14 calculates, as a discharged amount, energy consumption of the virtual machine 3 from the CPU allocated time 1313 in accordance with the consumption policy 111 and the allocation table 113.

In operation S4, the virtual battery manager 14 determines whether the virtual battery level 1413 for the virtual machine contained in the virtual battery management table 141 is zero.

In operation S5, when the virtual battery level 1413 is not zero ("No" in operation S4), the virtual battery manager 14 decrease the virtual battery level 1413 contained in the virtual battery management table 141 by a calculated discharged amount.

When the virtual battery level 1413 is zero ("Yes" in operation S4), the process proceeds to operation S10. At this time, the virtual battery manager 14 may notify the schedule manager 12 that allocation of the hardware resource 4 to the virtual machine 3 has been suspended.

Thus, the resource quota to the virtual machine 3 that has drained the virtual battery 10 may be controlled to suppress the maximum energy consumption of the computer as a whole by limiting resource utilization of the computer.

In operation S7, when the virtual machine 3 is not running ("No" in operation S2), the virtual battery manager 14 calculates a charged amount from the virtual machine stop time 1314 contained in the quota table 131 in accordance with the charge policy 112 and the allocation table 113.

In operation S8, the virtual battery manager 14 determines whether the virtual battery level 1413 for the virtual machine equals to the virtual battery capacity 1414.

In operation S9, when the virtual battery level 1413 does not equal to the virtual battery capacity 1414 ("No" in operation S8), a calculated charged amount is added to the virtual battery level 1413 up to the virtual battery capacity 1414. When the virtual battery level 1413 equals to the virtual battery capacity 1414 ("Yes" in operation S8), the process proceeds to operation S10.

Leveling of user's utilization time of the virtual machine 3 may be accelerated by defining a condition for charging such that the charged amount is adjusted in accordance with a time range over which the virtual machine 3 is stooped for a predefined time period or longer.

For example, increase in number of users who use the virtual machine 3 in nighttime may be expected by combining conditions for charging and discharging such that stopping the virtual machine 3 for one hour during a peak time range in daytime allows charge of the virtual battery 10 for two hours use in nighttime.

In operation S10, the virtual battery manager 14 determines whether the virtual batteries 10 for all the virtual machines 3 have been processed. When the virtual batteries 10 for some of the virtual machines 3 have not been processed ("No" in operation S10), the process returns to operation S2. When the virtual batteries 10 for all the virtual machines 3 have been processed ("Yes" in operation S10), the process terminates.

The management of the virtual battery 10 in the virtual machine system 1 will be discussed more specifically.

First Example

In a first example, the discharged amount of the virtual battery 10 is calculated in accordance with a load status of a computer of a virtual machine system 1 and utilization time of a resource in a virtual machine 3.

FIG. 5A is a graph illustrating an example of a relationship between energy consumption and resource utilization in a server of a virtual machine system according to a first embodiment of the present invention. FIG. 5B is a graph illustrating an example of variation of resource utilization over time in a server of a virtual machine system according to a first embodiment of the present invention.

It is assumed that the specifications of the server of the virtual machine system 1 includes maximum power consumption [W]=600 and idle-time power consumption [W]=120, and the relationship between power consumption [W] of the server and resource utilization [%] in the server is expressed by:

$$\text{power consumption of the server} = \text{resource utilization} \times 4.8 + 120$$

as illustrated in FIG. 5A.

In this case, energy consumption [Wh] of the server for T seconds may be expressed by:

$$\text{energy consumption of the server} = (\text{average resource utilization for } T \text{ seconds} \times 4.8 + 120) \times T/3600.$$

When one virtual machine 3 occupies a hardware resource 4 in a server for t seconds, the energy consumption [Wh] of the virtual machine 3 may be expressed as:

$$\text{energy consumption of the virtual machine 3} = \text{energy consumption of the server} \times t/T$$

It is assumed that the server is operating over time as illustrated in FIG. 5B, and that the hardware resource 4 is equally allocated to three virtual machines 3 each for just one second of among the three seconds in the time period when resource utilization in the server is 50%. The energy consumption [Wh] of each of the virtual machines 3 is calculated as:

$$\text{energy consumption of each virtual machine 3} = \{(50 \times 4.8+120) \times 3/3600\} \times 1/3 = 0.1.$$

Therefore, a discharge amount 0.1 Wh is decreased from the battery level of the virtual battery 10.

Second Example

In a second example, energy consumption of a server of a virtual machine system 1 is limited.

FIG. 6A is a diagram illustrating an example of a data configuration of a consumption policy set in a server of a virtual machine system according to a first embodiment of the present invention. A record of the consumption policy 151 includes a time range 1511 and energy consumption per hour 1512. FIG. 6B is a diagram illustrating an example of a data configuration of an allocation table set in a server of a virtual machine system according to a first embodiment of the present invention. A record of the allocation table 113 corresponds to a virtual machine and includes the virtual machine ID (denoted by "VM ID" in FIG. 6B) 1131, the ratio of energy consumption 1132, and the ratio of charge 1133.

It is assumed that, under the similar condition as that of the first example, energy consumption of the server is limited to 480 Wh per hour as illustrated in FIG. 6A, and that electric energy is equally allocated to 10 virtual machines 3 on the server as illustrated in FIG. 6B, where capacity of the virtual battery 10 for each virtual machine is 48 Wh.

Figure 7B:
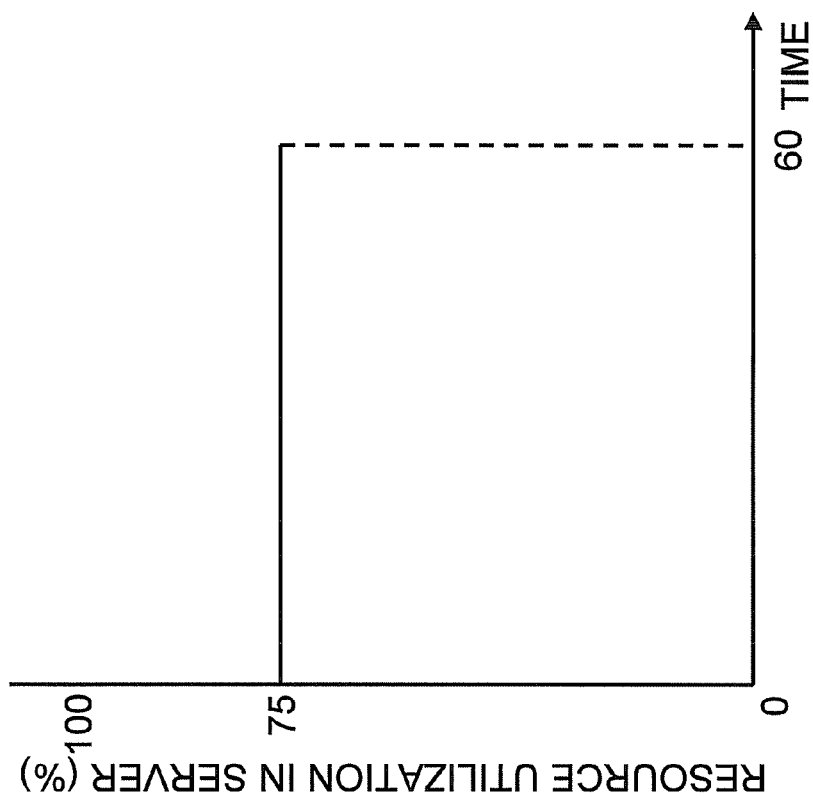
FIGS. 7A and 7B are graphs each illustrating an example of variation of resource utilization over time in a server of a virtual machine system according to a first embodiment of the present invention.
Figure 7A:
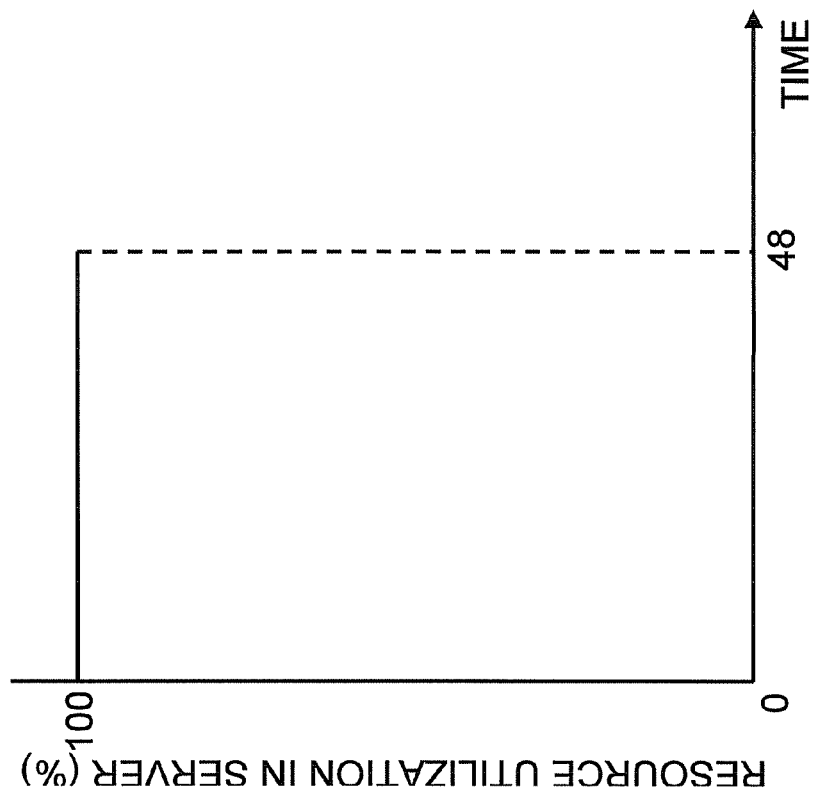

FIGS. 7A and 7B are graphs each illustrating an example of variation of resource utilization over time in a server of a virtual machine system according to a first embodiment of the present invention.

In a first operational status where the resource utilization of the server is 100% at all times and ten virtual machines 3 are equally operating, the battery level of the virtual battery 10 in each virtual machine 3 becomes zero in 48 minutes as illustrated in FIG. 7A.

In this case, the energy consumption [Wh] of each virtual machine 3 per 60 seconds is calculated as:

$$\text{energy consumption of each virtual machine 3} = \{(100 \times 4.8+120) \times 60/3600\} \times 1/10 = 1.$$

The energy consumption [Wh] of the server as a whole is calculated as:

$$\text{energy consumption of the server} = 1 \times 10 \times 48 = 480.$$

Therefore, if the server stops when all of the virtual machines 3 stop after a lapse of 48 minutes, the energy consumption may be kept to 480 Wh.

In a second operational status where the resource utilization of the server is 75% at all times and ten virtual machines 3 are equally operating, the battery level of the virtual battery 10 in each virtual machine 3 becomes zero in 60 minutes as illustrated in FIG. 7B.

In this case, the energy consumption [Wh] of each virtual machine 3 per 60 seconds is calculated as:

$$\text{energy consumption of each virtual machine 3} = \{(75 \times 4.8+120) \times 60/3600\} \times 1/10 = 0.8.$$

The energy consumption [Wh] of t the server as a whole is calculated as:

$$\text{energy consumption of the server} = 0.8 \times 10 \times 60 = 480.$$

Therefore, the energy consumption per hour may be kept to 480 Wh.

Third Example

In a third example, leveling of energy consumption is promoted by defining a condition for charging the virtual battery 10 of a stopped virtual machine in a similar case as that of the first example.

Figures 8A, 8B:
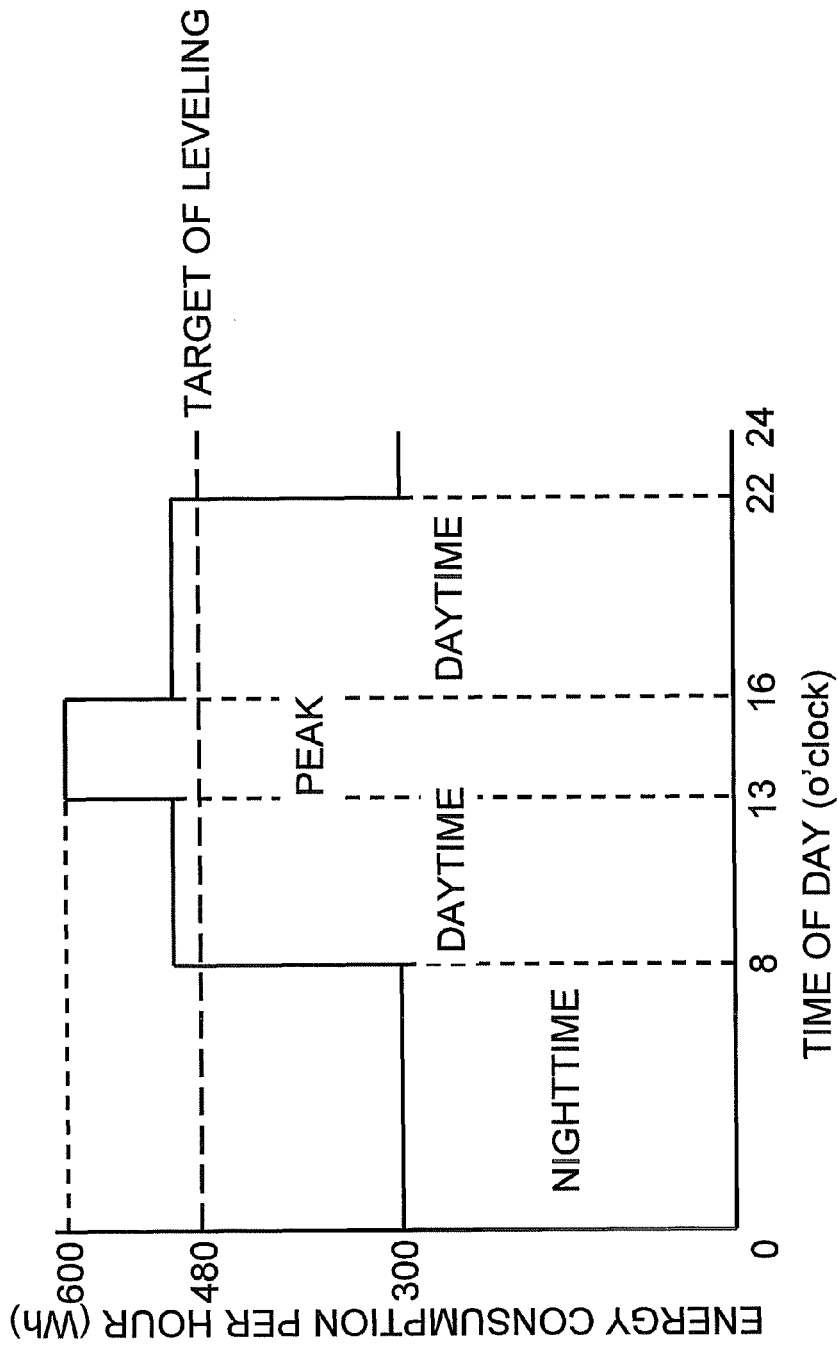
FIG. 8A is a graph illustrating an example of variation of energy consumption over time of a server of a virtual machine system according to a first embodiment of the present invention.
FIG. 8B is a diagram illustrating an example of a data configuration of a consumption policy set in a server of a virtual machine system according to a first embodiment of the present invention.

FIG. 8A is a graph illustrating an example of variation of energy consumption over time of a server of a virtual machine system according to a first embodiment of the present invention. FIG. 8B is a diagram illustrating an example of a data configuration of a consumption policy set in a server of a virtual machine system according to a first embodiment of the present invention. FIG. 8C is a diagram illustrating an example of a data configuration of a charge policy set in a server of a virtual machine system according to a first embodiment of the present invention. A record of the charge policy 112 includes a time range 1121 and a battery charge per hour 1122. FIG. 8D is a diagram illustrating an example of a data configuration of an allocation table set in a server of a virtual machine system according to a first embodiment of the present invention.

It is assumed that a total number of the virtual machines 3 on the server is eight, and that the battery capacity of each virtual battery 10 is 48 Wh.

In this case, energy consumption of the server is defined for each time range as illustrated in FIG. 8A, and average energy consumption per hour is defined to be 480 Wh as illustrated in FIG. 8B like in the second example. The charge policy 112 is defined for each time range as illustrated in FIG. 8C.

The battery capacity of the virtual battery 10 of VM1, for example, is calculated to be 48 Wh in accordance with the consumption policy 151 illustrated in FIG. 8B and the allocation table 113 illustrated in FIG. 8D. In accordance with the charge policy 112 illustrated in FIG. 8C and the allocation table 113, the time required for fully charging an empty virtual battery 10 of VM1 is calculated as:

charging time [h] in nighttime=48/(60×0.1)=8 charging time [h] in daytime=48/(96×0.1)=5 charging time [h] peak hours=48/(160×0.1)=3

Therefore, if a virtual machine 3 is stopped in peak hours, the virtual battery 10 of the virtual machine may be charged in a shorter time than that in nighttime. As a result, users may avoid the use of the virtual machines 3 in peak hours, which allows the leveling of the energy consumption.

Second Embodiment

Figure 9:
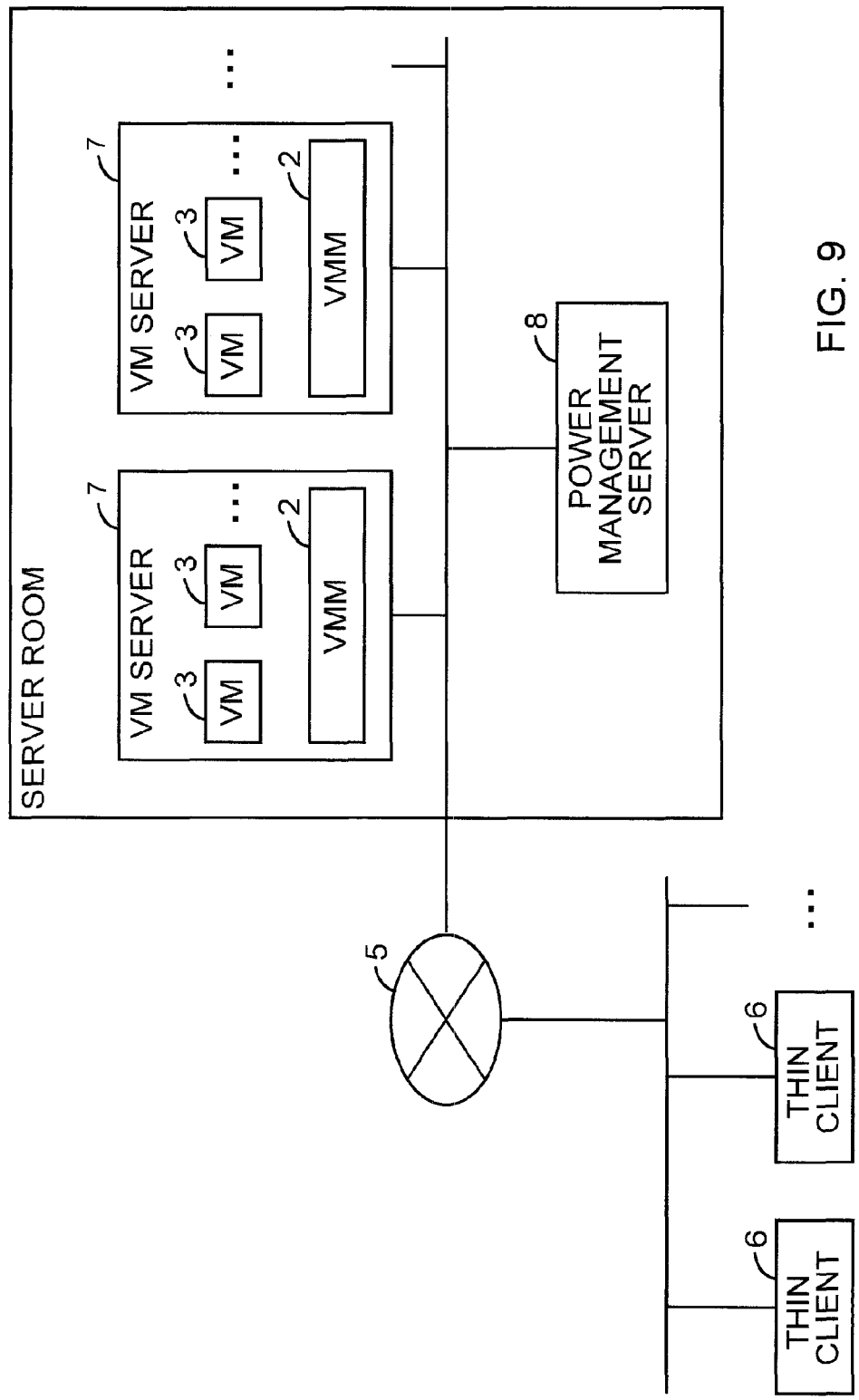
FIG. 9 is a diagram illustrating a configuration of a virtual machine system according to a second embodiment of the present invention.

FIG. 9 is a diagram illustrating a configuration of a virtual machine system according to a second embodiment of the present invention. A virtual machine system 1 according to a second embodiment of the present invention is installed in a server room and includes a plurality of virtual machine servers (denoted by "VM SERVER" in FIG. 9) 7. Virtual machines 3 are run on the virtual machine servers 7 and used from thin clients 6 over a network 5 under remote desktop protocol (RDP), for example.

Most functions of the virtual machine server 7 are similar to that of the virtual machine system 1 according to the first embodiment of the present invention, and the difference is that the virtual machine monitor 2 in each virtual machine server communicates with a external power management server 8 to obtain and set the consumption policy 111 and the charge policy 112 In the second embodiment.

Because each of the virtual machines 3 has the virtual battery 10, the virtual machine server may operate like a laptop personal computer (PC) without connection of an alternate current (AC) adapter. With the virtual machine system 1 which is not originally battery-driven, the resource usage may be kept within predefined energy consumption.

Having described the embodiments, different variations may be made to the embodiments without departing from the scope and spirit of the present invention.

For example, a plurality of virtual machines 3 operating in a computer may share one virtual battery 10.

Furthermore, the power policy setter 11 may be provided as an external device that is capable of network-communication with the virtual machine system 1.

The virtual battery discussed above allows to grasp energy consumption of each virtual machine to manage the consumable energy by discharging and charging the energy calculated in accordance with the maximum energy consumption of each computer.

Thus, the resource usage by a virtual machine which is originally not driven by a battery, may be controlled in accordance with energy consumption, suppressing the energy consumption of the virtual machine system as a whole.

The amount of resource usage by a virtual machine is visualized as energy consumption which may be controlled in accordance with the energy consumption target of the virtual machine system and/or charging system.

The promotion of power saving in system operations may be expected, because a guest OS executed on a virtual machine may detect the battery level of the virtual battery so as to implement active power saving operations.

The battery level of the virtual battery may be checked through the OS by a user of the virtual machine. Therefore, the promotion of conscious power saving actions may be expected, such as frequent shut down of an unused virtual machine.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A virtual machine system, comprising:
a virtual machine monitor that executes on a physical machine for running a plurality of virtual machines, the virtual machine monitor including:
a virtual battery manager for managing a virtual battery for running a virtual machine, the virtual battery holding electric energy used by the virtual machine, the virtual battery being capable of discharging and being charged;
a schedule manager for allocating a resource of the physical machine to the virtual machine;
a resource quota manager for managing resource allocated time for each of the plurality of virtual machines in accordance with status data acquired from the schedule manager, the status data indicating an allocated status of the resource on each of the plurality of virtual machines;
a discharge calculator for calculating a discharged amount of the virtual battery by calculating energy consumption of the virtual machine with reference to a consumption policy and a consumption allocation table, in response to a discharge condition of only when a total amount of the resource allocated time for the virtual machine during a predefined time period is greater than a predefined threshold value, the consumption policy defining a maximum amount of total energy shared by the plurality of virtual machines, the consumption allocation table containing an allocated ratio of energy consumption for each of the plurality of virtual machines; and a discharger for decreasing a battery level of the virtual battery.

2. The virtual machine system of claim 1, wherein the virtual machine monitor further includes:

a consumption policy setter for setting the consumption policy.

3. The virtual machine system of claim 1, wherein the virtual machine monitor further includes:

a charge calculator for calculating a charged amount of the virtual battery with reference to a charge policy and a charge allocation table when the resource allocated time for the virtual machine satisfies a predefined condition for charging, the charge policy defining a maximum amount of total charged energy for the virtual batteries of the plurality of virtual machines, the charge allocation table containing an allocated ratio of charged energy for each of the plurality of virtual machines; and a charger for increasing the battery level of the virtual battery.

4. The virtual machine system of claim 3, wherein the virtual machine monitor further includes:

a charge policy setter for setting the charge policy.

5. The virtual machine system of claim 3, wherein the consumption policy or the charge policy is set in accordance with maximum energy consumption of the physical machine measured during a predefined time period.

6. The virtual machine system of claim 3, wherein the consumption policy or the charge policy is defined as a list of maximum energy consumption data of the physical machine measured during a predefined time period.

7. The virtual machine system of claim 3, wherein the predefined condition for charging is that a total amount of time over which the resource is allocated during a predefined time period is less than or equals to a predefined threshold value.

8. The virtual machine system of claim 3, wherein the predefined condition for charging is that a total amount of time elapsed after the virtual machine stopped is greater than or equals to a predefined threshold value.

9. The virtual machine system of claim 3, wherein the virtual machine system is communicably connected with a charge policy setter for setting the charge policy over a communication network.

10. The virtual machine system of claim 1, wherein the schedule manager allocates the resource to the virtual machine in accordance with the battery level of the virtual battery.

11. The virtual machine system of claim 1, wherein the virtual machine monitor further includes:

a resource utilization monitor for monitoring resource utilization of the physical machine, wherein the discharge calculator adjusts the predefined threshold value in accordance with the resource utilization of the physical machine.

12. The virtual machine system of claim 1, wherein the predefined threshold value is defined in accordance with maximum energy consumption of the physical machine.

13. The virtual machine system of claim 1, wherein the predefined threshold value is defined for each time or each time period.

14. The virtual machine system of claim 1, wherein the predefined threshold value is defined in accordance with a total number of virtual machines running on the physical machine.

15. The virtual machine system of claim 1, wherein the predefined threshold value is defined in accordance with a priority assigned to each of the plurality of virtual machines.

16. The virtual machine system of claim 1, wherein the predefined threshold value is defined in accordance with electric energy assigned to the physical machine.

17. The virtual machine system of claim 1, wherein the plurality of virtual machines running on the physical machine share the virtual battery.

18. The virtual machine system of claim 1, wherein the virtual machine system is communicably connected with a consumption policy setter for setting the consumption policy over a communication network.

19. A non-transitory computer-readable medium that causes a computer to execute functions of a virtual machine system for running a plurality of virtual machines on a physical machine, the virtual machine system including:

a virtual battery manager for managing a virtual battery for running a virtual machine, the virtual battery holding electric energy used by the virtual machine, the virtual battery being capable of discharging and being charged, a schedule manager for allocating a resource of the physical machine to the virtual machine, a resource quota manager for managing resource allocated time for each of the plurality of virtual machines in accordance with status data acquired from the schedule manager, the status data indicating an allocated status of the resource on each of the plurality of virtual machines, a discharge calculator for calculating a discharged amount of the virtual battery by calculating energy consumption of the virtual machine with reference to a consumption policy and a consumption allocation table, in response to a discharge condition of only when a total amount of the resource allocated time for the virtual machine during a predefined time period is greater than a predefined threshold value, the consumption policy defining a maximum amount of total energy shared by the plurality of virtual machines, the consumption allocation table containing an allocated ratio of energy consumption for each of the plurality of virtual machines, and a discharger for decreasing a battery level of the virtual battery.

* * * * *